United States Patent
Abe

(10) Patent No.: US 10,680,801 B2
(45) Date of Patent: Jun. 9, 2020

(54) DATA DISTRIBUTION AGAINST CREDENTIAL INFORMATION LEAK

(71) Applicant: INTERNATIONAL BUSINESS MACHINES CORPORATION, Armonk, NY (US)

(72) Inventor: Atsushi Abe, Ebina (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

(21) Appl. No.: 15/813,355

(22) Filed: Nov. 15, 2017

(65) Prior Publication Data
US 2019/0149318 A1     May 16, 2019

(51) Int. Cl.
    *H04L 9/06*     (2006.01)
    *H04L 9/30*     (2006.01)
    *H04L 29/08*    (2006.01)

(52) U.S. Cl.
    CPC .............. *H04L 9/0618* (2013.01); *H04L 9/30* (2013.01); *H04L 67/1097* (2013.01); *H04L 2209/24* (2013.01)

(58) Field of Classification Search
    CPC ..... H04L 9/0618; H04L 9/30; H04L 67/1097; H04L 2209/24
    See application file for complete search history.

(56) References Cited

U.S. PATENT DOCUMENTS

| | | | | |
|---|---|---|---|---|
| 5,870,470 A | * | 2/1999 | Johnson | H04L 9/0618 380/28 |
| 6,246,768 B1 | * | 6/2001 | Kim | H04L 9/0625 380/28 |
| 6,725,372 B1 | * | 4/2004 | Lewis | G06T 1/0035 375/E7.089 |
| 7,051,211 B1 | * | 5/2006 | Matyas, Jr. | G06F 21/10 380/201 |
| 9,379,890 B1 | * | 6/2016 | Blakely | H04L 9/0822 |
| 9,680,809 B2 | | 6/2017 | Seul et al. | |
| 2004/0131181 A1 | * | 7/2004 | Rhoads | H04L 9/34 380/37 |

(Continued)

FOREIGN PATENT DOCUMENTS

| | | |
|---|---|---|
| JP | 2014010465 A | 1/2014 |
| JP | 2016212293 A | 12/2016 |

OTHER PUBLICATIONS

Subramanian et al., "Enhanced Security for Data Sharing in Multi Cloud Storage (SDSMC)," (IJACSA) International Journal of Advanced Computer Science and Applications, vol. 8, No. 3, 2017 (10 pages).

(Continued)

*Primary Examiner* — J. Brant Murphy
(74) *Attorney, Agent, or Firm* — Griffiths & Seaton PLLC

(57) ABSTRACT

A system and method for data distribution against credential information leak are presented. A data block may be encrypted with block cryptograph on virtual storage so as to create an encrypted block. The virtual storage may be obtained by virtualizing one or more cloud storages of a storage area network (SAN). The encrypted block may be divided into one or more divided blocks. Store-blocks may be generated by combining divided blocks from the encrypted block and different encrypted blocks. The store-blocks may be stored in the one or more cloud storages.

20 Claims, 7 Drawing Sheets

(56) References Cited

U.S. PATENT DOCUMENTS

| | | | |
|---|---|---|---|
| 2008/0232591 A1* | 9/2008 | Jutla | H04L 9/0637 380/277 |
| 2012/0042162 A1* | 2/2012 | Anglin | G06F 21/602 713/165 |
| 2012/0047339 A1* | 2/2012 | Decasper | G06F 11/1076 711/162 |
| 2012/0204030 A1* | 8/2012 | Nossik | H04L 9/0822 713/168 |
| 2013/0259225 A1* | 10/2013 | Onoda | H04L 9/0637 380/28 |
| 2014/0325212 A1* | 10/2014 | Della Corte | G06F 21/6272 713/164 |
| 2016/0335017 A1* | 11/2016 | Itoh | G06F 3/0623 |
| 2016/0359622 A1* | 12/2016 | Bunch | H04L 9/0822 |
| 2017/0046531 A1* | 2/2017 | Roberts | G06F 21/6218 |
| 2017/0061141 A1* | 3/2017 | Redberg | G06F 21/602 |
| 2018/0011865 A1* | 1/2018 | Bowman | G06F 21/602 |

OTHER PUBLICATIONS

Wei et al., "Data privacy protection using multiple cloud storages," Proceedings 2013 International Conference on Mechatronic Sciences, Electric Engineering and Computer (MEC), Dec. 20-22, 2013 (2 pages).

Shen et al., "CloudS: A Multi-cloud Storage System with Multi-level Security," International Conference on Algorithms and Architectures for Parallel Processing, Nov. 2015 (3 pages).

Patil et al., "Data Security using Multi Cloud Architecture," International Journal on Recent and Innovation Trends in Computing and Communication, vol. 3, Issue 5, May 2015 (4 pages).

* cited by examiner

DATA DISTRIBUTION AGAINST CREDENTIAL INFORMATION LEAK

BACKGROUND OF THE INVENTION

Field of the Invention

The present invention relates in general to computing systems, and more particularly to, various embodiments for data distribution and protection against credential information leak by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these computing systems. The amount of information to be processed nowadays increases greatly. Therefore, processing, storing, and securing very large amounts of information are key problems to solve.

SUMMARY OF THE INVENTION

Various embodiments for data distribution and protection against credential information leak using one or more processors are provided. In one embodiment, by way of example only, a method for data distribution against credential information leak, again by a processor, is provided. A data block may be encrypted with block cryptograph on virtual storage so as to create an encrypted block. The virtual storage may be obtained by virtualizing one or more cloud storages of a storage area network (SAN). The encrypted block may be divided into one or more divided blocks. Store-blocks may be generated by combining divided blocks from the encrypted block and from different encrypted blocks. The store-blocks may be stored in the one or more cloud storages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
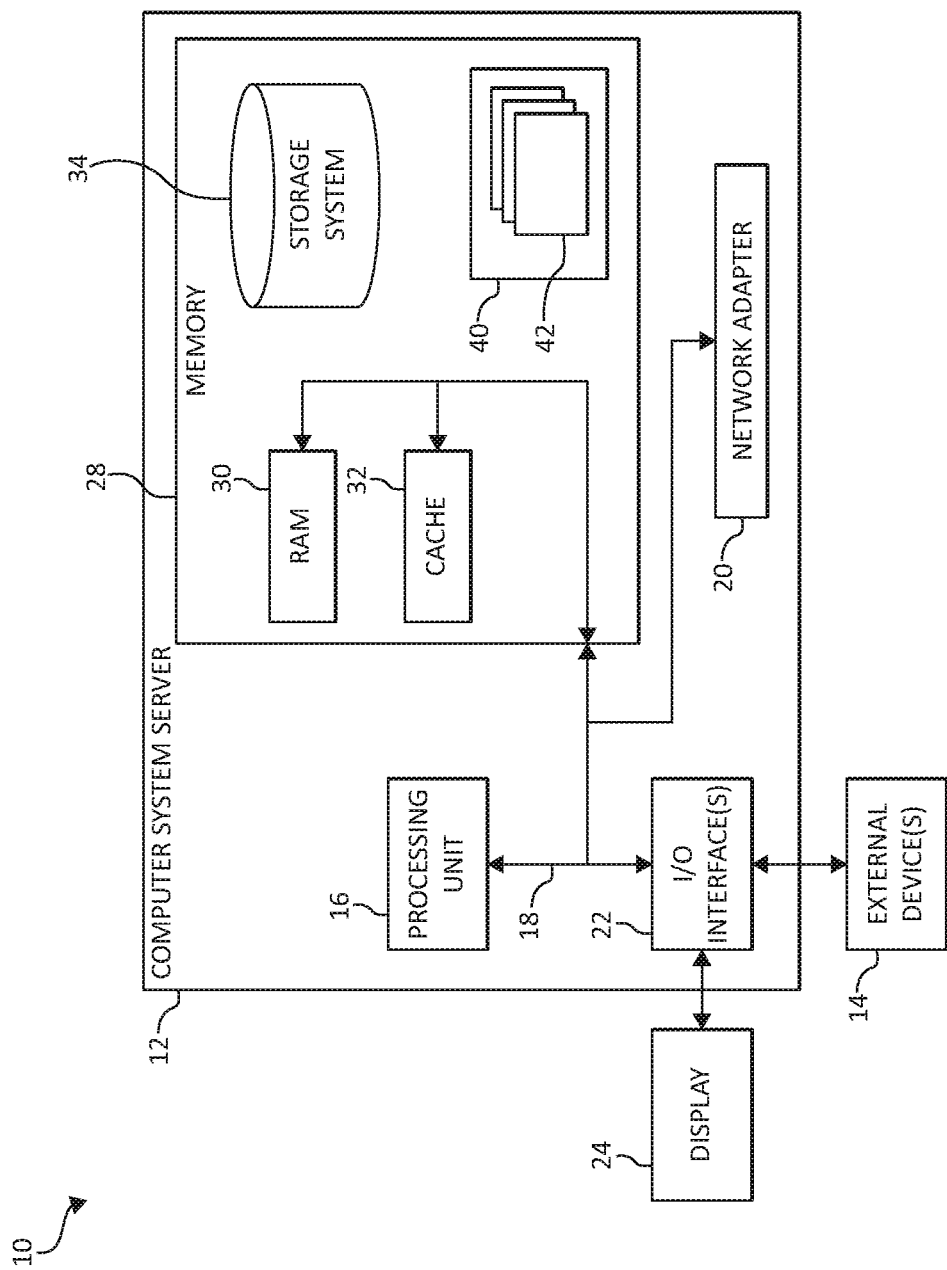
FIG. 1 is a block diagram depicting an exemplary computing node according to an embodiment of the present invention.

As a preliminary matter, computing systems may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Moreover, the cloud computing environment is an enhancement to the predecessor grid environment, whereby multiple grids and other computation resources may be further abstracted by a cloud layer, thus making disparate devices appear to an end-user as a single pool of seamless resources. That is, multiple cloud storages may be treated as one single storage disk, which may be supported by, for example, an IBM® SAN volume controller (SVC). These resources may include such things as physical or logical compute engines, servers and devices, device memory, storage devices, networks, business applications and other software, and the like. As part of managed storage services, a storage service provider maintains and manages the storage infrastructure for an enterprise customer. To maintain a flexible storage infrastructure for multiple clients, managed storage services offer use of storage virtualization. That is, a cloud computing service provider may provision and allocate requested resources for a user by means of virtualization. Thus, the actual underlying infrastructure (e.g., servers, network devices, storage units, etc.) may be transparent to the user. Also, the cloud computing service provider may provision and allocate an additional, requested amount of resources to service the needs of a user.

Due to the cloud computing infrastructure being shared and accessed by various end users, it is critical that the content and data is kept secure and confidential. It is also critical to keep the sensitive content and data secure from malicious attacks from hackers and other third parties as well. Thus, access to cloud storage may require credential information such as, for example, an identifier (ID) and a password. If this information is leaked or stolen, any person who obtains the ID and/or password may access the data stored on the cloud storage.

Accordingly, a need exits to protect distribution and storage of data against credential information leaks. In one aspect, a symmetric key pair encryption process may be used. One key is a public key, which can be shared publicly; whereas the other key is a private key, which must be kept in a secure local location. This type of encryption provides a very high degree of authentication whenever the cloud computer is being accessed, but may be too slow as cloud computing technologies increase.

Accordingly, in one aspect, a data block may be encrypted with block cryptograph on virtual storage so as to create an encrypted block. The virtual storage may be obtained by virtualizing one or more cloud storages of a storage area network (SAN). The encrypted block may be divided into one or more divided blocks. Store-blocks may be generated by combining divided blocks from the encrypted block and different encrypted blocks. The store-blocks may be stored in the one or more cloud storages.

Block cryptography is faster than public key encryption and may be used in a real-time encryption engine for a tape drive and a large-volume disk device. In one aspect, a block cryptographic key encrypted by a public key encryption scheme may be stored (such as on a tape volume or cloud storage system) to control access to the storage device from each user. The block cryptography may be an encryption operation including two operations of encryption E and decryption $E^{-1}$. That is, a block of "b" bits and a key of "k" bits may be used as input and a block of b bits may be used as output, where b and k are positive integers or selected values. In other words, encryption of a plain text of b bits with a key of k bits provides an encrypted text of b bits, and decryption of the encrypted text of b bits with the key of k bits provides the original plain text of b bits. Even if the encrypted text is wrong by one bit, the decryption fails and the original plain text cannot be obtained by an inappropriate user and/or attacker (e.g., the plain text is not partially decrypted). In one aspect, the various embodiments of the present invention prevent the content of data from being seen or accessed, even when credential information for a cloud storage is leaked, by utilizing the block cryptography characteristic such that the decryption of block cryptography is not partially achieved.

Thus, various embodiments provided herein provide a storage area network having multiple cloud storages and a virtual storage obtained by virtualizing the cloud storages. An encrypted block may be produced by encrypting a block (e.g., a plain text data block) written to the virtual storage with a block cryptograph. The encrypted block may be divided (e.g., divided into multiple divided encrypted blocks). Multiple store-blocks may be produced by combining the respective blocks divided from different encrypted blocks. That is, each store-block stored in the cloud storage may be comprised of a block divided from a first encrypted block and a block divided from a second encrypted block. In an additional aspect, the store-blocks stored in the various, respective cloud storages may be divided. The first encrypted block may be stored in one section or area of cloud storage(s) and a block divided from a second encrypted block may be stored in the same section or area of the cloud storage(s) or different section or area of the cloud storage(s). Each encrypted block may be restored or rebuilt by combining the corresponding divided blocks from the applicable store-block. The rebuilt encrypted block may be decrypted with the block cryptograph and the written block may be then read upon decryption.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
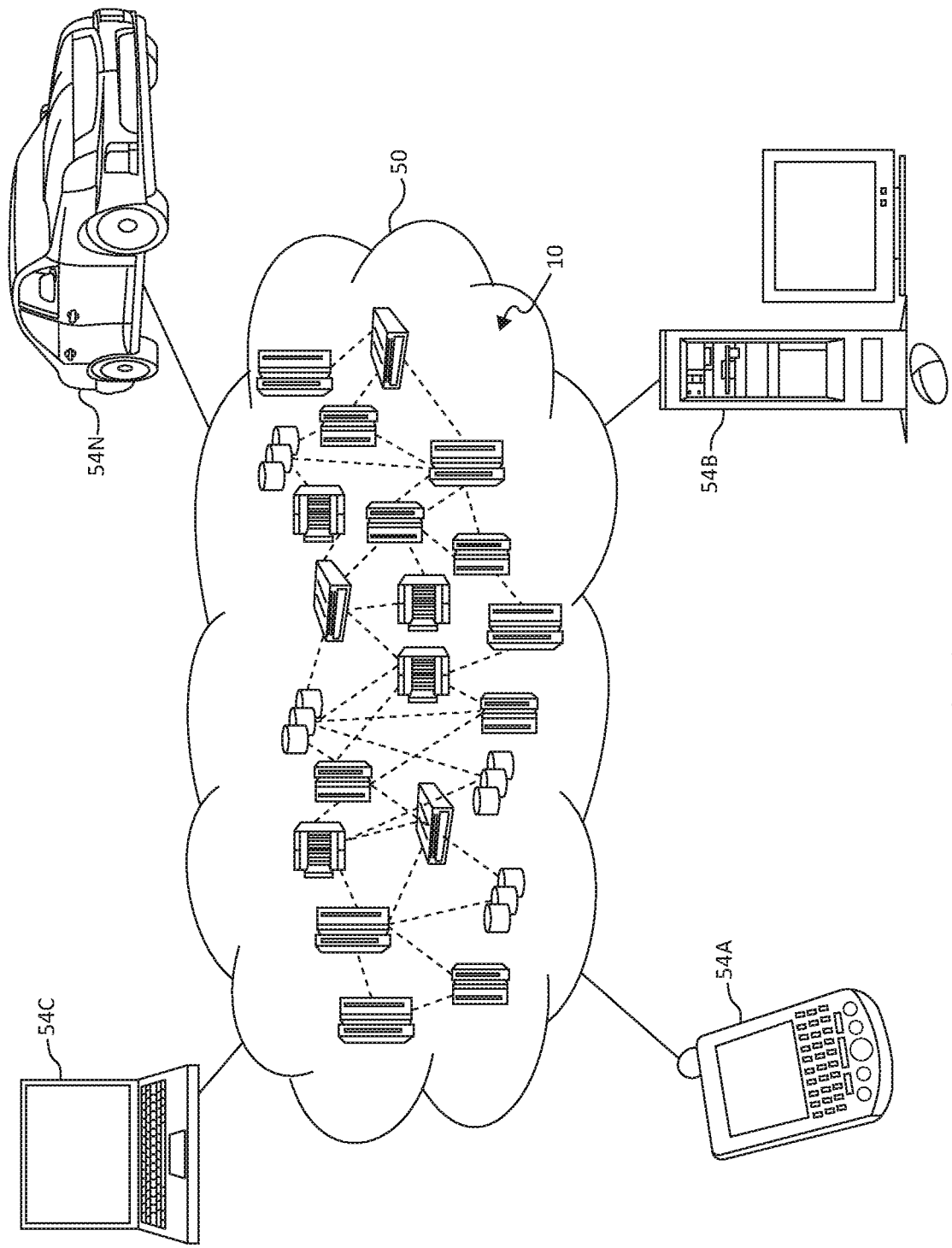
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
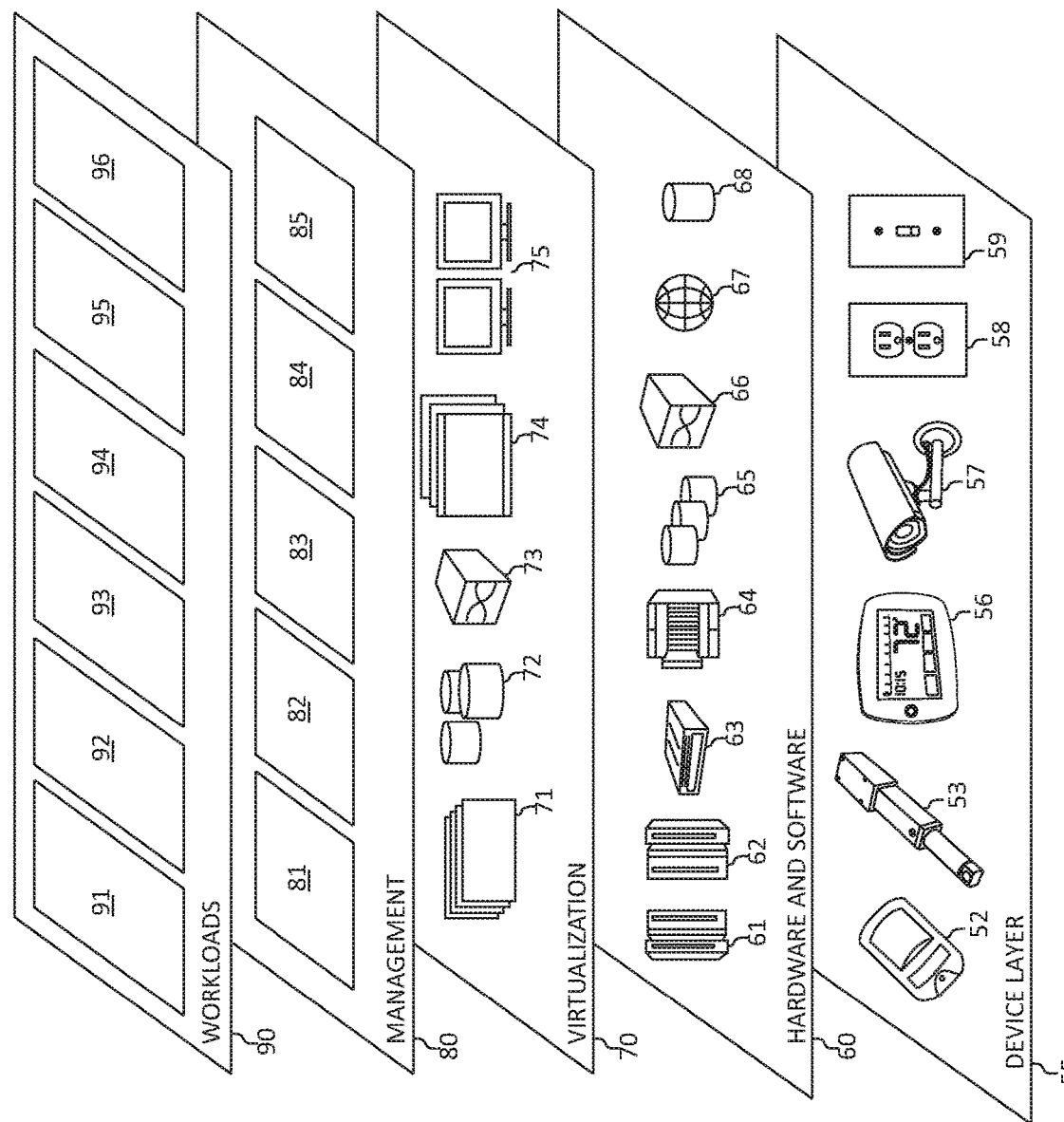
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various credential information leak protection workloads and functions 96. In addition, credential information leak protection workloads and functions 96 may include such operations as data analytics, data analysis, and as will be further described, notification functionality. One of ordinary skill in the art will appreciate that the credential information leak protection workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In one aspect, the mechanisms of the illustrated embodiments provide a novel approach for detecting recurrent crowd mobility patterns such as, for example, a data block may be encrypted with block cryptograph on virtual storage so as to create an encrypted block. The virtual storage may be obtained by virtualizing one or more cloud storages of a storage area network (SAN). The encrypted block may be divided into one or more divided blocks. Store-blocks may be generated by combining divided blocks from the encrypted block and different encrypted blocks. The store-blocks may be stored in the one or more cloud storages.

Figure 4:
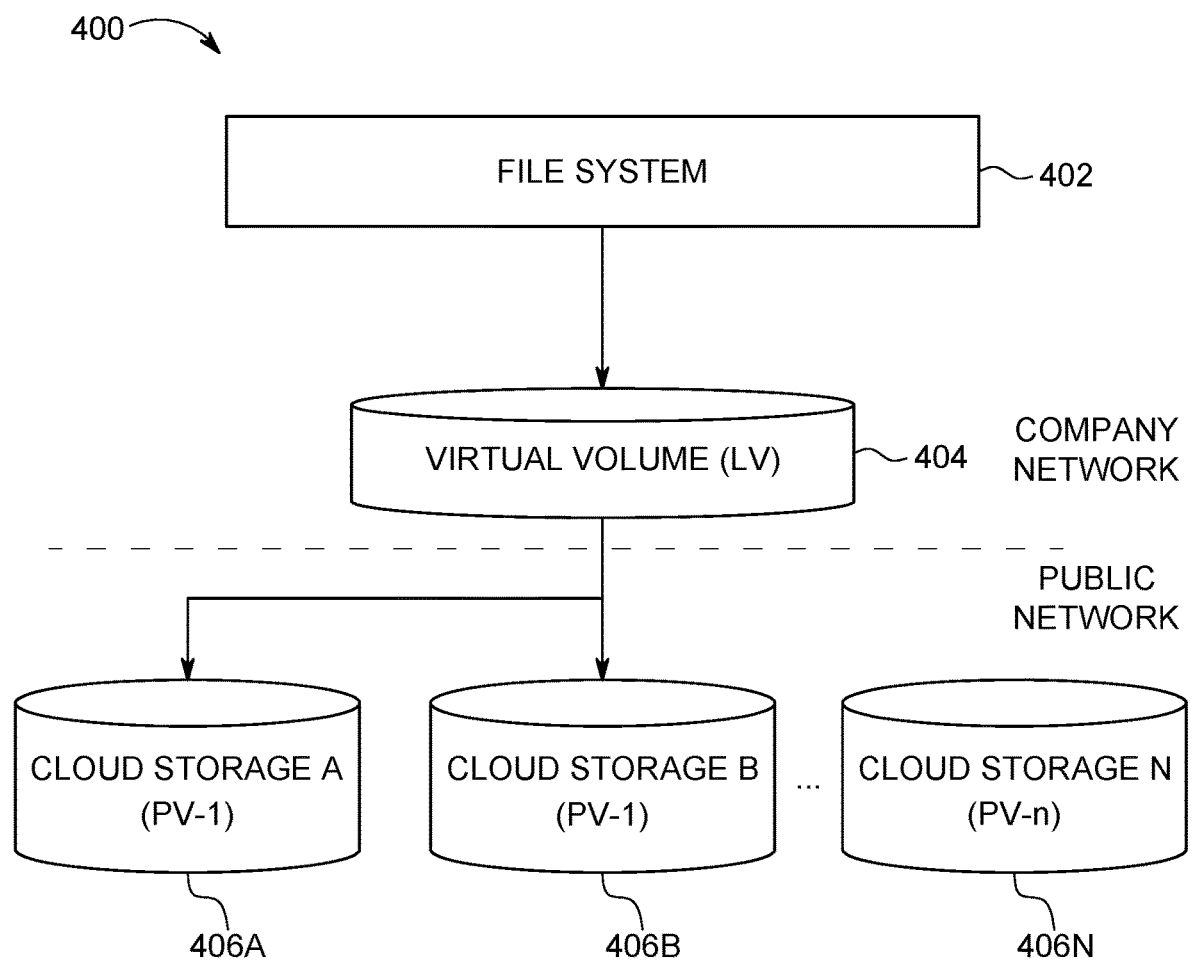
FIG. 4 is an additional block diagram depicting an exemplary functional relationship between various aspects of the present invention.

Turning now to FIG. 4, a block diagram of exemplary functionality 400 of a file system having multiple cloud storage system is depicted. As one of ordinary skill in the art will appreciate, the depiction of the various functional units in the file system having multiple cloud storage system 400 is for purposes of illustration, as the functional units may be located within the file system having multiple cloud storage system 400 or elsewhere within and/or between distributed computing components. Also, the functional blocks 400 of the file system 400 may be implemented in hardware and/or software, such as by the computer/server 12 (FIG. 1), the workloads layer 90 (FIG. 3), and/or one or more processing unit(s) 16 to perform various computational, data processing and other functionality in accordance with various aspects of the present invention.

As shown, the file system having multiple cloud storage system 400 may include the file system 402, a virtual volume (LV) 404, and one or more cloud storage devices/systems such as, for example, cloud storage device A 406A (PV-1), cloud storage device B 406B (PV-1), and/or cloud storage device N 406N (PV-n).

In one aspect, the multiple cloud storages (e.g., cloud storage devices 406A-N) may be handled and treated as part of a large storage system such as, for example, treated as one virtual volume (LV). The file system 402 may be established on the virtual volume LV as illustrated in FIG. 1. The virtual volume 404 may be provided on a private network (e.g., a network inside a company or a server inside a company). The virtual volume 404 may be configured to access multiple cloud storages (PV-n) (e.g., cloud storage devices 406A-N) as necessary. The virtual volume 404 may be obtained by virtualizing one or more cloud storages (e.g., cloud storage devices 406A-N). In one aspect, the cloud storage devices 406A-N may be in a storage area network (SAN).

Figure 5:
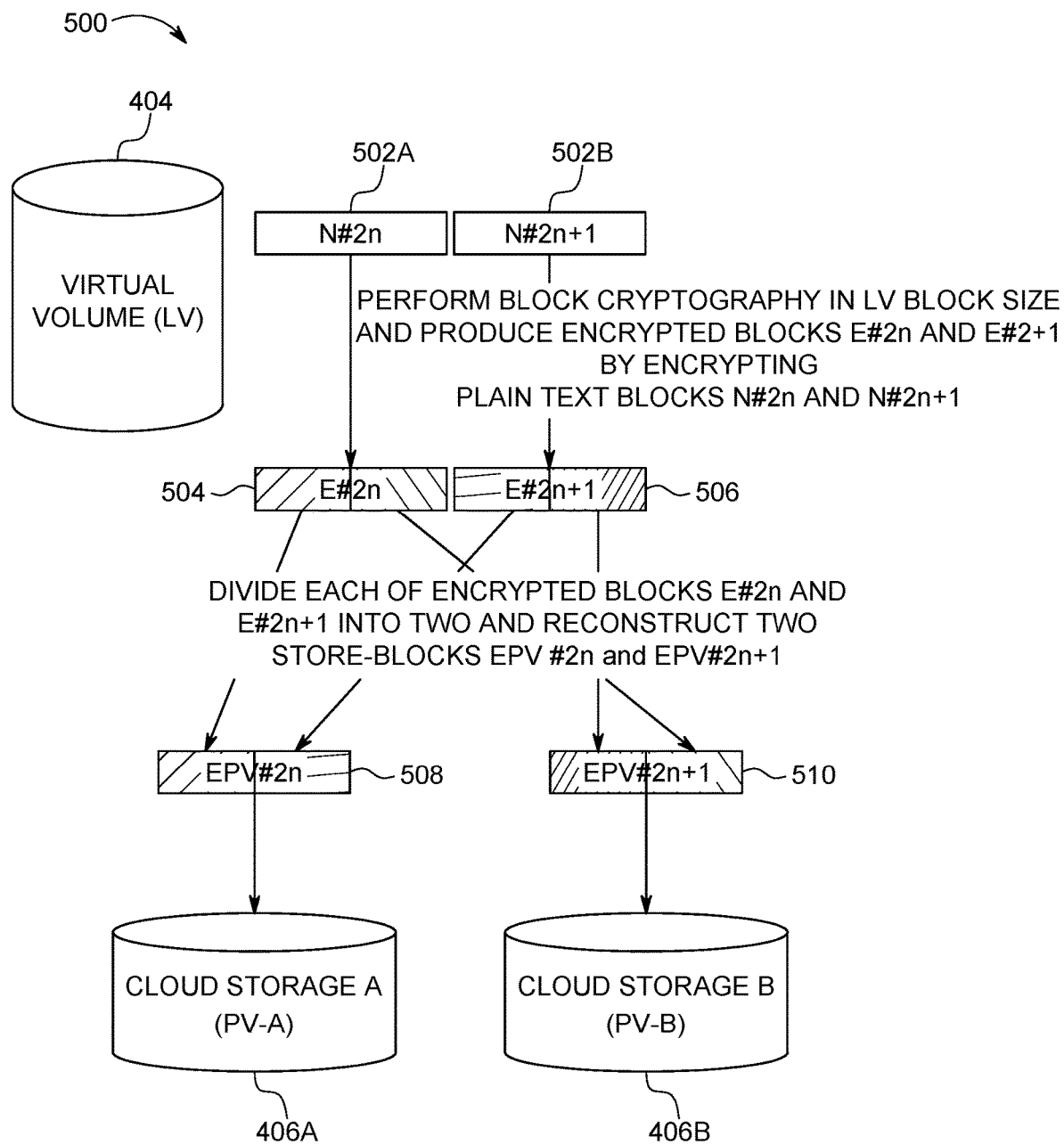
FIG. 5 is an additional block diagram depicting encryption of a data block and block reconstruction of the present invention.

Turning now to FIG. 5, an additional block diagram 500 depicting encryption of a data block and block reconstruction. In one aspect, one or more of the components, modules, services, applications, and/or functions described in FIGS. 1-4 may be used in FIG. 5. As will be seen, many of the functional blocks may also be considered "modules" of functionality, in the same descriptive sense as has been previously described in FIG. 4.

In operation, the virtual volume 404 (see also FIG. 4) may produce one or more encrypted blocks (E) 504, 506 by encrypting one or more plain-text blocks (N) 502A, 502B of the virtual volume 404 by block cryptography. The virtual volume 404 may divide each of the encrypted blocks (E) 504, 506 into n parts (e.g., n number of divided encrypted blocks) such as, for example, encrypted blocks E #2n and E #2n+1. That is, encrypted blocks E #2n and E #2n+1 may be produced by encrypting the one or more plain-text blocks (N) 502A, 502B.

Also, each of the encrypted blocks E #2n 504 and E #2n+1 506 may be divided into two or more divided, encrypted blocks with the various divided, encrypted blocks being combined together in a variety of combinations to produce one or more store-blocks. Said differently, the virtual volume 404 may generate or produce one or more store-blocks (EPV) 508, 510 such as, for example, store-block EPV #2n and store-block EPV #2n+1 by reconstructing the n divided encrypted blocks. The store-blocks (EPV) 508, 510 may be stored in the one or more cloud storages (e.g., cloud storage devices 406A and/or 406B). Accordingly, each store-block EPV such as, for example, store-blocks (EPV) 508, 510 may be a collection of parts (or blocks or segments) of different encrypted blocks E (e.g., encrypted blocks E #2n 504 and E #2n+1 506), and thus cannot be decrypted with any key. This configuration achieves a system that restricts or disables partial decryption even when credential information of one of the one or more cloud storages (e.g., cloud storage devices PV-A 406A and PV-B 406B) is leaked.

At reading (e.g., a reading operation), the encrypted blocks E #2n 504 and E #2n+1 506 may be reproduced from the encrypted store-blocks EPV #2n 508 and EPV #2n+1 510. In this way, the original plain-text blocks N #2n 502A and N #2n+1 502B can be reproduced.

Thus, the mechanisms of the present invention may be applicable even to a scenario in which the number of cloud storages (e.g., cloud storage devices PV-A 406A and PV-B 406B) is equal to or greater than two cloud storages by increasing the number of divisions (e.g., divisions of encrypted blocks and/or cloud storages) or by increasing the number of plain-text blocks while the number of divisions (of encrypted blocks) is maintained at two. Also, the mechanisms of the present invention may be applicable to both a computing environment with the virtual volume 404 (see also FIG. 4) being a virtualized disk, but also to a layered file system by performing encryption and division of each file.

Figure 6:
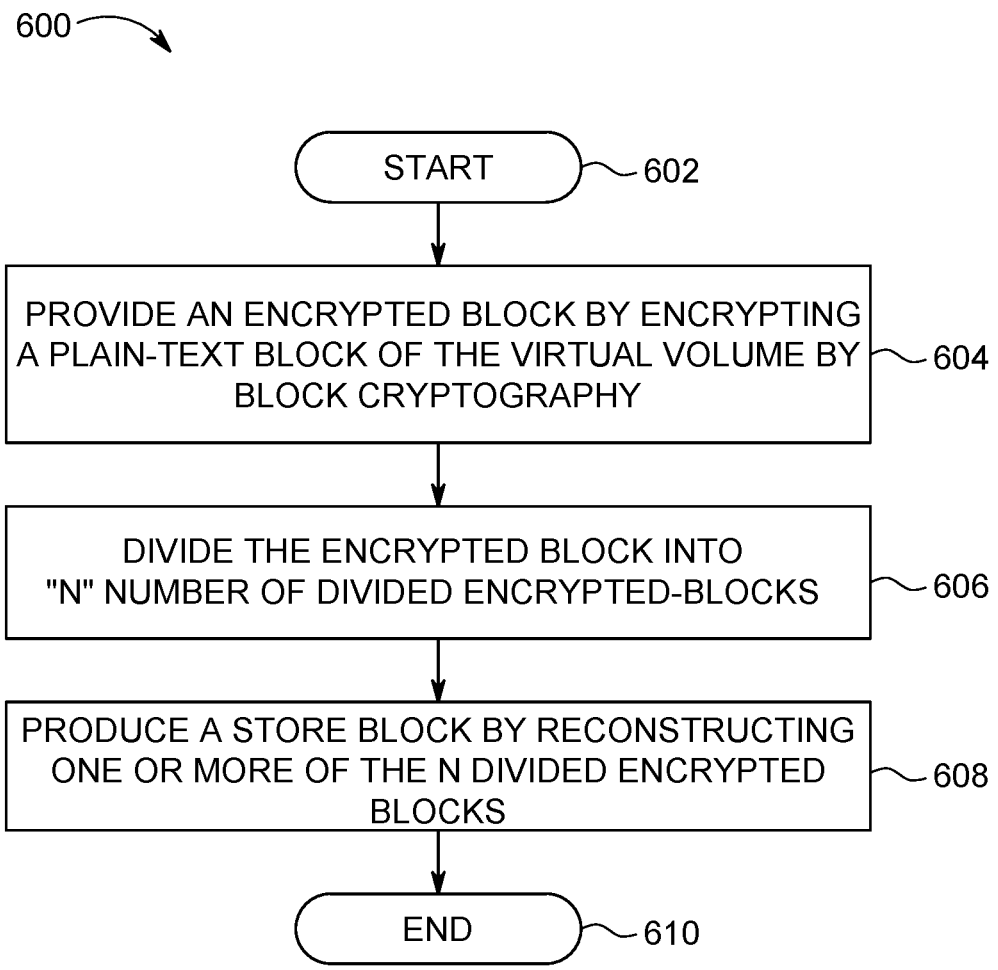
FIG. 6 is an additional flowchart diagram depicting an additional exemplary method for data distribution against credential information leak by a processor, again in which aspects of the present invention may be realized.

Turning now to FIG. 6, a method 600 for data distribution against credential information leak by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602. An encrypted block may be provided by encrypting a plain-text block of the virtual volume by block cryptography, as in block 604. The encrypted block may be divided into "N" number of divided encrypted blocks (where "N" is a positive integer or selected or defined numerical value), as in block 606. A store-block may be produced by reconstructing one or more of the N number of divided encrypted blocks, as in block 608. The functionality 600 may end, as in block 610.

Figure 7:
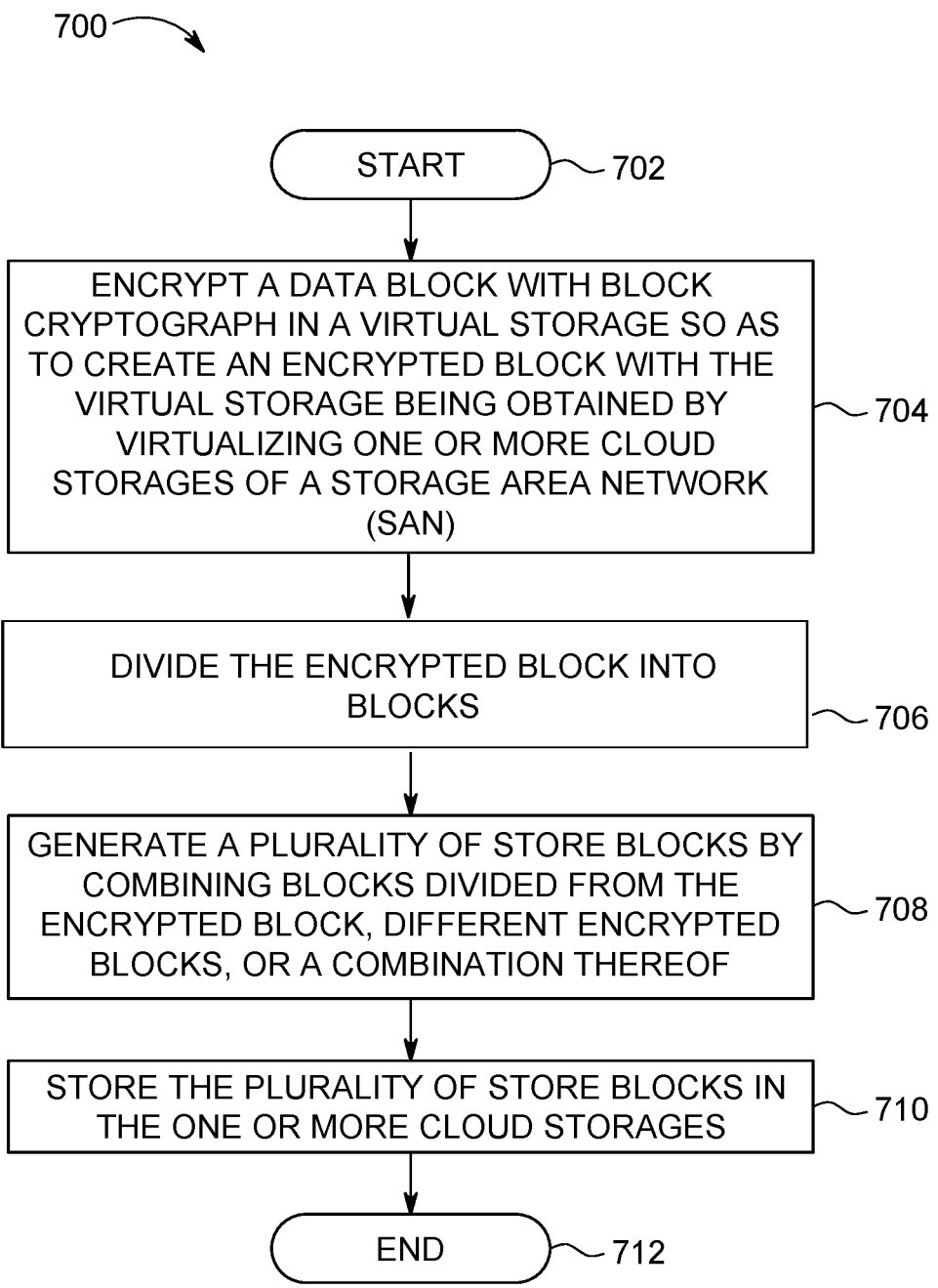
FIG. 7 is an additional flowchart diagram depicting an additional exemplary method for data distribution against credential information leak by a processor, again in which aspects of the present invention may be realized.

Turning now to FIG. 7, a method 700 for data distribution against credential information leak by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. A data block may be encrypted with block cryptograph in virtual storage so as to create an encrypted block with the virtual storage being obtained by virtualizing one or more cloud storages of a storage area network (SAN), as in block 704. The encrypted block may be divided into blocks (e.g., two or more divided, encrypted blocks), as in block 706. Store-blocks may be generated by combining divided blocks from the encrypted block, blocks from different encrypted blocks, or a combination thereof (e.g., combining divided blocks from the encrypted and divided blocks from different encrypted blocks), as in block 708. The store-blocks may be stored in the one or more cloud storages, as in block 710. The functionality 700 may end, as in block 712.

In one aspect, in conjunction with and/or as part of at least one block of FIGS. 6-7, the operations of methods 600 and/or 700 may include each of the following. The operations of methods 600 and/or 700 may divide the encrypted block into a plurality of divided blocks. The one or more divided blocks of the encrypted block may be combined with one or more alternative divided blocks of an alternative encrypted block. Each one of the plurality of store-blocks may be generated from one or more divided blocks of the encrypted block and one or more divided blocks of an alternative encrypted block. Each of the plurality of store-blocks may be divided in the one or more cloud storages.

The operations of methods 600 and/or 700 may rebuild the encrypted block from the plurality of store-blocks by combining corresponding blocks divided from the encrypted block and decrypt the rebuilt encrypted block to enable reading the data block.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for data distribution against credential information leak by a processor, comprising:
    encrypting a data block with a block cipher on virtual storage so as to create an encrypted block, wherein the virtual storage is obtained by virtualizing one or more cloud storages of a storage area network (SAN);
    in response to creating the encrypted block, dividing the encrypted block;
    generating a plurality of store-blocks by combining blocks divided from the encrypted block, different encrypted blocks, or a combination thereof; and
    in response to generating the plurality of store-blocks, storing the plurality of store-blocks in the one or more cloud storages.

2. The method of claim 1, further including dividing the encrypted block into a plurality of divided blocks.

3. The method of claim 1, further including combining one or more divided blocks of the encrypted block with one or more alternative divided blocks of an alternative encrypted block.

4. The method of claim 1, further including generating each one of the plurality of store-blocks from one or more divided blocks of the encrypted block and one or more divided blocks of an alternative encrypted block.

5. The method of claim 1, further including dividing each of the plurality of store-blocks in the one or more cloud storages.

6. The method of claim 1, further including rebuilding the encrypted block from the plurality of store-blocks by combining corresponding blocks divided from the encrypted block.

7. The method of claim 6, further including decrypting the rebuilt encrypted block to enable reading the data block.

8. A system for data distribution against credential information leak, comprising:
    one or more computers with executable instructions that when executed cause the system to:
    determine encrypting a data block with a block cipher on virtual storage so as to create an encrypted block, wherein the virtual storage is obtained by virtualizing one or more cloud storages of a storage area network (SAN);
    in response to creating the encrypted block, divide the encrypted block;
    generate a plurality of store-blocks by combining blocks divided from the encrypted block, different encrypted blocks, or a combination thereof; and
    in response to generating the plurality of store-blocks, store the plurality of store-blocks in the one or more cloud storages.

9. The system of claim 8, wherein the executable instructions further divide the encrypted block into a plurality of divided blocks.

10. The system of claim 8, wherein the executable instructions further combine one or more divided blocks of the encrypted block with one or more alternative divided blocks of an alternative encrypted block.

11. The system of claim 8, wherein the executable instructions further generate each one of the plurality of store-blocks from one or more divided blocks of the encrypted block and one or more divided blocks of an alternative encrypted block.

12. The system of claim 8, wherein the executable instructions further divide each of the plurality of store-blocks in the one or more cloud storages.

13. The system of claim 8, wherein the executable instructions further rebuild the encrypted block from the plurality of store-blocks by combining corresponding blocks divided from the encrypted block.

14. The system of claim 13, wherein the executable instructions further decrypt the rebuilt encrypted block to enable reading the data block.

15. A computer program product for, by a processor, data distribution against credential information leak, the computer program product comprising a non-transitory computer-readable storage medium having computer-readable program code portions stored therein, the computer-readable program code portions comprising:
    an executable portion that determines encrypting a data block with a block cipher on virtual storage so as to create an encrypted block, wherein the virtual storage is obtained by virtualizing one or more cloud storages of a storage area network (SAN);
    an executable portion that, in response to creating the encrypted block, divides the encrypted block;
    an executable portion that generates a plurality of store-blocks by combining blocks divided from the encrypted block, different encrypted blocks, or a combination thereof; and
    an executable portion that, in response to generating the plurality of store-blocks, stores the plurality of store-blocks in the one or more cloud storages.

16. The computer program product of claim 15, further including an executable portion that divides the encrypted block into a plurality of divided blocks.

17. The computer program product of claim 15, further including an executable portion that combines one or more divided blocks of the encrypted block with one or more alternative divided blocks of an alternative encrypted block.

18. The computer program product of claim 15, further including an executable portion that generates each one of the plurality of store-blocks from one or more divided blocks of the encrypted block and one or more divided blocks of an alternative encrypted block.

19. The computer program product of claim 15, further including an executable portion that divides each of the plurality of store-blocks in the one or more cloud storages.

20. The computer program product of claim 15, further including an executable portion that:
    rebuilds the encrypted block from the plurality of store-blocks by combining corresponding blocks divided from the encrypted block; and
    decrypts the rebuilt encrypted block to enable reading the data block.

* * * * *